United States Patent [19]
Byers

[11] Patent Number: 5,980,622
[45] Date of Patent: Nov. 9, 1999

[54] MAGENTA DYES FOR INK-JET INKS

[75] Inventor: Gary W. Byers, Vista, Calif.

[73] Assignee: Hewlett-Packard Company, Palo Alto, Calif.

[21] Appl. No.: 08/921,397

[22] Filed: Aug. 29, 1997

[51] Int. Cl.$^6$ .................................................. C09D 11/02
[52] U.S. Cl. ..................................... 106/31.48; 106/31.57
[58] Field of Search ........................... 106/31.48, 31.27, 106/31.57

[56] References Cited

U.S. PATENT DOCUMENTS

| | | | |
|---|---|---|---|
| 4,052,374 | 10/1977 | Baumann | 106/31.48 |
| 4,207,104 | 6/1980 | Chapman et al. | 430/225 |
| 4,273,706 | 6/1981 | Chapman et al. | 260/156 |
| 4,772,323 | 9/1988 | Baxter et al. | 106/31.48 |
| 4,824,485 | 4/1989 | Tanaka et al. | 106/31.48 |
| 4,892,584 | 1/1990 | Chapman | 106/31.48 |
| 5,330,542 | 7/1994 | Maeda et al. | 106/31.48 |
| 5,531,816 | 7/1996 | Wickramanayake | 106/31.6 |
| 5,565,022 | 10/1996 | Wickramanayake | 106/31.27 |

FOREIGN PATENT DOCUMENTS

| | | | |
|---|---|---|---|
| 3713624 | 11/1987 | Germany | C09D 11/00 |

*Primary Examiner*—Helene Klemanski

[57] ABSTRACT

A class of magenta dye chromophores generally described as metal complexes with dye ligands of 4-hydroxy-3-(2'-pyridylazo)-1-(sulfo substituted) naphthalene for use in ink-jet inks is disclosed. The dye ligands are coordinated to a polyvalent metal. The dye-metal complexes of the present invention provide excellent ink-jet prints having excellent lightfastness when exposed to direct sun light as well as office light.

16 Claims, 1 Drawing Sheet

Figure 1

MAGENTA DYES FOR INK-JET INKS

FIELD OF THE INVENTION

The present invention generally relates to ink-jet printing, and in particular to a class of dyes for improving ink-jet lightfastness while maintaining desireable light absorption characteristics.

BACKGROUND OF THE INVENTION

The use of ink-jet printing systems have grown dramatically in recent years. This growth may be attributed to substantial improvements in print resolution and overall print quality coupled with appreciable reduction in cost. Today's ink-jet printers offer acceptable print quality for many commercial, business, and household applications at costs fully an order of magnitude lower than comparable products available just a few years ago. Notwithstanding their recent success, intensive research and development efforts continue toward improving ink-jet print quality. A surge in interest in ink-jet printing has resulted in the need to produce high quality prints at a reasonable cost. The challenge remains to further improve the print quality and lightfastness of ink-jet prints. The use of large format ink-jet prints for point-of-purchase displays, posters and signage, requires high-resolution images that are durable.

Color ink-jet printers typically use three inks of differing hues: magenta, yellow, and cyan, and optionally black. The particular set of colorants, e.g., dyes, used to make the inks is called a "primary dye set." A spectrum of colors, e.g., secondary colors, can be generated using differing combinations of the primary dye set. Magenta dyes currently used in ink-jet printing typically have exhibited a high level of lightfade when exposed to direct sun light as well as office light. Thus, challenge remains to further improve the lightfastness of the magenta dyes utilized in ink-jet printing.

DISCLOSURE OF THE INVENTION

In accordance with the invention, inks suitable for use in ink-jet inks and method for formulating the same are provided. A class of magenta dye chromophores generally described as metal complexes with dye ligands of 4-hydroxy-3-(2'-pyridylazo)-1-(sulfo substituted) naphthalene is disclosed, more specifically, the magenta dye-ligand is selected from the group consisting of 4-hydroxy-3-(2'-pyridylazo)-1-naphthalenesulfonic acid; 4-hydroxy-3-(2'-pyridylazo)-1-naphthalenesulfonic acid; 4-hydroxy-3-(2'-pyridylazo)-1-naphthalenesulfonamide; N-substituted-4-hydroxy-3-(2'-pyridylazo)-1-naphthalenesulfonamide; N,N-bis(substituted)-4-hydroxy-3-(2'-pyridylazo)-1-naphthalenesulfonamide; and mixtures thereof; said dye ligand being coordinated to a polyvalent metal. More preferably, the polyvalent metal is selected from the group consisting of Ni(II), Cu(II), Co(II), Zn(II), and Cr(III). These dyes provide excellent ink-jet prints having excellent lightfastness when exposed to direct sun light as well as office light.

In the practice of the invention, the magenta ink can be aqueous-based or oil-based. The aqueous inks of the present invention comprise from about 1 to about 5 wt % of at least one water-soluble dye and an aqueous vehicle comprising the following components (in wt % of total ink composition): from about 5 to about 30 wt % of at least one water soluble organic solvent; 0 to about 1.5 wt % of at least one component independently selected from the group consisting of surfactants, buffers, biocides, and metal chelators; and water. The oil-based inks formulated according to the present invention comprise at least one oil-soluble dye, and a microemulsion comprising at least one high boiling water-insoluble organic compound, at least one amphiphile, optionally a second high boiling organic compound miscible with both aqueous and organic phases, and water, wherein the amphiphile is present in an amount sufficient to solubilize the water-insoluble organic compound.

DETAILED DESCRIPTION OF THE INVENTION

The invention described herein is directed to magenta dye chromophores for use in inks used with commercially available ink-jet printers such as Deskjet printers, manufactured by Hewlett-Packard Company, Palo Alto, Calif. More specifically, a class of magenta dye chromophores for formulating magenta inks is disclosed. These magenta dye chromophores enable the production of high-quality ink-jet prints with excellent lightfastness of a variety of media, including uncoated paper, clay coated paper, as well as specially formulated ink-jet imaging media in reflection, translucent, and transparent forms. Specially formulated ink-jet coatings may include swellable water-soluble and cross-linked water-soluble coatings such as gelatin, polyvinyl alcohols; porous inorganic coatings; and a wide variety of combinations and other coating strategies.

All concentrations herein are in weight percent of total ink composition, unless otherwise indicated. The purity of all components is that employed in normal commercial practice for ink-jet inks.

The class of magenta dye chromophores used herein may generally be described as metal complexes with dye ligands of 4-hydroxy-3-(2'-pyridylazo)-1-(sulfo substituted) naphthalene, and more preferably, sulfonamide substituted ligands of the types: 4-hydroxy-3-(2'-pyridylazo)-1-naphthalenesulfonamide; N-substituted-4-hydroxy-3-(2'-pyridylazo)-1-naphthalenesulfonamide; and N,N-bis (substituted)-4-hydroxy-3-(2'-pyridylazo)-1-naphthalenesulfonamide. α-PyridylAzoNaphthol dye ligand (α-PAN) complexes ionizing the 4-hydroxynaphthyl moiety and coordinating in a tridentate fashion polyvalent metals, such as Nickel II ($Ni^{+2}$), Cobalt II ($Co^{+2}$), Copper II ($Cu^{+2}$), Zinc II ($Zn^{+2}$), and Chromium III ($Cr^{+3}$), with one or preferably two dyes per metal atom depending on the coordination number of the metal atom. The $2\alpha\text{-PAN}:1Ni^{+2}$ complexes have a net charge of zero (0) in the "inner sphere of the Ni (II) complex", because of the anionic charge of the ligand. The $2\alpha\text{-PAN}:1Ni^{+2}$ complexes also have very desirable hues for ink-jet applications and are lightfast as compared to conventional magenta dyes used in ink-jet applications. Furthermore, to have utility in ink-jet printing, dyes should have at least a solubility of 1.5 wt %, and preferably greater than about 3 wt %, in the ink formulation. Inks made according to the present invention exhibited the desired solubilities in the ink formulations.

More specifically, the dye ligands of the present invention have formula I wherein
- $R_1$ is independently selected from the group consisting of $R_2$, and $R_3$;
- $R_2$ is $SO_3M$, wherein M is a positively charged moiety;
- $R_3$ is $SO_2NR_4R_5$; and
- $R_4$ and $R_5$ are independently selected from the group consisting of hydrogen, and hydrophobic oil-solubilizing moieties, or $R_4$ is selected from the group consisting of hydrogen and hydrophbilic water-solubilizing moieties and $R_5$ is selected from the group consisting of hydrophilic water solubilizing moieties.

So for example $R_4$ and $R_5$ can be:
- $R_4$ and $R_5$=H;
- $R_4$=H and $R_5$=hydrophobic;
- $R_4$ and $R_5$=hydrophobic;
- $R_4$=H and $R_5$=hydrophilic;
- $R_4$ and $R_5$=hydrophilic.

More specifically, the metal complex comprising the dye ligands of the present invention has formula II

FORMULA II wherein
- $R_1, R_2, R_3, R_4$, and $R_5$ are as defined above;
- Me is a polyvalent metal; and
- Z is either another dye ligand or a colorless ligand to complete the coordination sphere, said colorless ligand selected to provide the appropriate solubility. When there is more than one dye ligand, the ligands can be the same or different.

More specifically, M is selected from the group consisting of H, Li, Na, K, Cs, protonated amines, and quaternary ammoniums; and Me is selected from the group consisting of Nickel II ($Ni^{+2}$), Cobalt II ($Co^{+2}$), Copper II ($Cu^{+2}$), Zinc II ($Zn^{+2}$), and Chromium III ($Cr^{+3}$), and and most preferably Me is Nickle II ($Ni^{+2}$).

Depending on the selection of $R_1$ substituents, the dye/metal complex may be water-soluble or oil-soluble.

The inks of the present invention comprise from about 1 to about 5 wt % dye, and depending upon the printing application (e.g. producing images on special media or producing text on "plain paper") preferably, from about 1.5 to about 3.5 wt % dye, and more preferably, from about 2 to about 3 wt % dye.

WATER-SOLUBLE DYES

The simple sulfonamide ($R_4$=$R_5$=H) is relatively insoluble in water at neutral pH. To improve water solubility, it is useful to manipulate the substituents, $R_4$ and $R_5$, on the sulfonamide group. This can be done by introducing water solubilizing moieties such as charged groups, anionic and cationic, and neutral groups.

The anionic water solubilizing moiety may be selected from, but not limited to, the anionic derivative selected from conjugate bases of the group consisting of alkyl or aryl sulfonic acids, alkyl or aryl carboxylic acids, alkyl or aryl phosphate, alkyl or aryl phosphonic acids, and oxy anions; such as, $—CH_2—CH_2—CH_2—SO_3^-$, $—CH_2—COO^-$, and $CH_2—CH_2—P(O)(OH)_2$.

The anionic water solubilizing moiety is an anionic derivative selected from conjugate bases on the group consisting of alkyl or aryl sulfonic acids, alkyl or aryl carboxylic acids, alkyl or aryl phosphate, alkyl or aryl phosphonic acids, and oxy anions.

The cationic water solubilizing moiety may be selected from, but not limited to, the group consisting of alkyl or aryl protonated amines and quaternary ammoniums, for example, $—CH_2—CH_2—N^+(CH_3)$, $—CH_2—CH_2—N^+H_3$, or $—CH_2—CH_2$-Pyridinium$^+$.

The neutral water solubilizing moiety is selected from neutral groups containing large fractions of either or both nitrogen and oxygen atoms, for example, amines, amides, alcohols, ethers, ketones, and heterocyclics.

The aqueous inks of the present invention comprise an aqueous vehicle comprising (in wt % of total ink composition) from about 5 to about 30 wt % of at least one water soluble organic solvent; 0 to about 1.5 wt % of at least one component independently selected from the group consisting of surfactants, buffers, biocides, and metal chelators; and water.

ORGANIC SOLVENT

The aqueous inks of the present invention comprise from about 5 to about 30 wt % organic solvent. More preferably, the inks comprise from about 8 to about 15 wt % organic solvent, with a concentration from about 9 to about 11 wt % being the most preferred.

The water soluble organic solvents suitable employed in the present ink-jet ink compositions include any of, or a mixture of two ore more, of such compounds as nitrogen-containing heterocyclic ketones, such as 2-pyrrolidone, N-methyl-pyrrolid-2-one (NMP), 1,3-dimethylimidazolid-2-one, and octyl-pyrrolidone; diols such as ethanediols (e.g., 1,2-ethandiol), propanediols (e.g., 1,2-propanediol, 1,3-propanediol, 2-ethyl-2-hydroxy-methyl-1,3-propanediol, ethylhydroxy-propanediol (EHPD), butanediols (e.g., 1,2-butanediol, 1,3-butanediol, 1,4-butanediol), pentanediols (e.g., 1,2-pentanediol, 1,5-pentanediol), hexanediols (e.g., 1,6-hexanediol, 2,5-hexanediol, 1,2-hexanediol), heptanediols (e.g., 1,2-heptanediol, 1,7-heptanediol), octanediols (e.g., 1,2-octanediol, 1,8-octanediol); glycol ethers and thioglycol ethers, commonly employed in ink-jet inks, such as polyalkylene glycols such as polyethylene glycols (e.g., diethylene glycol (DEG), triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400), and thiodiglycol.

SURFACTANT

The aqueous inks of the present invention optionally comprise 0 to about 1.5 wt % surfactant. More preferably, the inks comprise from about 0.5 to about 1.3 wt % surfactant, with a concentration from about 0.8 to about 1.2 wt % being the most preferred.

In the practice of the invention, one ore more surfactants may optionally be used. Non-ionic surfactants, such as secondary alcohol ethoxylates (e.g., Tergitol series available from Union Carbide Co.), non-ionic fluoro surfactants (such as FC170C available from 3M), non-ionic fatty acid ethoxylate surfactants (e.g., Alkamul PSMO-20 available from Rhone-Poulenc), and fatty amide ethoxylate surfactants (e.g., Aldamide L203 available from Rhone-Poulenc) are preferred, with secondary alcohol ethoxylates being the most preferred. In the practice of the invention, the secondary alcohol ethoxylates serve to prevent color to color bleed by increasing the penetration of the inks into the print medium. Secondary alcohol ethoxylates are nonionic surfactants and are commercially available, for example, from Union Carbide Co. (Houston, Tex.) as the Tergitol series, such as Tergitol 15-S-5 and Tergitol 15, -S-7.

The secondary alcohol ethoxylates contain (a) an aliphatic chain having a prescribed number of carbon atoms in the chain, and (b) a prescribed number of ethoxylated units. These ethoxylates are commercially available as mixtures of ethoxylates, and so are described in terms of the predominance of a given compound. Secondary alcohol ethoxylates suitable employed in the practice of the invention predominantly have from about 12 to about 18 carbon atoms in the aliphatic chain, while the number of ethoxylated units is predominantly in the range from about 4 to about 8 units. Thus, "Tergitol 15-S-5" represents a secondary alcohol ethoxylated surfactant predominantly having about 15 carbons in its aliphatic chain and about 5 ethoxylated units.

BUFFER

The aqueous inks of the present invention optionally comprise 0 to about 1.5 wt % buffer. More preferably, the inks comprise from about 0.1 to about 0.5 wt % buffer, with a concentration from about 0.1 to about 0.3 wt % being the most preferred.

Buffers employed in the practice of the invention to modulate pH can be organic-based biological buffers or inorganic buffers, preferably, organic-based. Furthermore, the buffers employed should provide a pH ranging from about 3 to about 9 in the practice of the invention, and maintain the pH at the selected levels to ensure desired states of ionization of any ionizable moieties. Examples of preferably-employed buffers include Trizma Base (slightly alkaline), 4-morpholineethanesulfonic acid (MES) (slightly acidic), and 4-morpholinepropanesulfonic acid (MOPS) (neutral), all available from Aldrich Chemical (Milwaukee, Wis.).

METAL CHELATOR

The aqueous inks of the present invention optionally comprise 0 to about 1.5 wt % metal chelator. Since a metal chelator may compete with the dye-ligand for the metal in the colorant complex, it should be used judiciously with minimum levels. Preferably, the inks comprise less than about 0.5 wt % metal chelator, with a concentration of less than 0.3 wt % being the most preferred.

Metal chelators employed in the practice of the invention are used to bind transition metal cations that may be present in the ink. Examples of preferably-employed metal chelators include: Ethylenediaminetetraacetic acid (EDTA), Diethylenetriaminepentaacetic acid (DPTA), trans-1,2-diaminocyclohexanetetraacetic acid (CDTA), (ethylenedioxy) diethylenedinitrilotetraacetic acid (EGTA), or other chelators that can bind transition metal actions.

BIOCIDE

The aqueous inks of the present invention optionally comprise 0 to about 1.5 wt % biocide. More preferably, the inks comprise from about 0.1 to about 0.5 wt % biocide, with a concentration from about 0.1 to about 0.3 wt % being the most preferred.

Any of the biocides commonly employed in ink-jet inks may be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250.

OIL-SOLUBLE DYES

The $R_3$ substituents on the dye may be selected to impart oil solubility on the dye. To impart oil solubility the $R_4$ and $R_5$ moieties are independently selected from the group consisting of hydrogen and hydrophobic oil solubilizing moieties. The hydrophobic moiety is selected from the group consisting of aliphatic, aromatic, and aliphatic-aromatic functionalities, provided that the hydrophobic moiety comprises at least four carbon atoms. Any hydrophobic groups, such as dibenzyl moieties derived from the sulfonamide of a dibenzyl amine, or the di-n-hexyl moieties derived from the sulfonamide of di-n-hexyl amine can be used as the oil-solubilizing moieties. Preferably, the hydrophobic moiety is selected from the group consisting of n-hexyl, benzyl, and t-butyl. Preferably, the oil-solubilizing groups have conformational mobility to reduce crystallinity of the dye.

When the dye used is oil-soluble, the ink can be prepared using microemulsion-based inks such as those described in U.S. application Ser. No. 08/892,767, entitled "Reliability Enhancement of Microemulsion-Based Ink-Jet Inks", by Wickramanayake, filed Jul. 15, 1997 and incorporated herein by reference; U.S. application Ser. No. 08/741,147, entitled "Bleed Alleviated Aqueous Pigment Dispersion-Based Ink-Jet Compositions", by Wickramanayake et al, filed Oct. 29, 1996; U.S. Pat. No. 5,531,816, entitled "Bleed-Alleviated, Waterfast Pigment-Based Ink-Jet Compositions", issued Jul. 2, 1996, by Wickramanayake; and U.S. Pat. No. 5,565,022, entitled "Fast Drying, Bleed-Free Ink-Jet Ink Compositions", by Wickramanayake, issued Oct. 15, 1996; all assigned to the assignee of the present invention. The inks comprising oil-soluble dyes may also be prepared by employing well known methods such as emulsions, and dispersions containing the dye in polymerized/cross linked solid phase.

Microemulsion-based ink-jet ink vehicles consist of two liquid phases: the discontinuous oil phase and the continuous aqueous phase.

The solubilizer—the most preferred class being hydrotropes—mainly resides at the oil-water interface. However, solubilizers also reside in the aqueous phase due to their solubility in water (especially so in the case of hydrotropes).

The oil-soluble microemulsion-based ink-jet ink compositions of the present invention comprise at least one dye, and a microemulsion comprising at least one water-insoluble organic compound, at least one amphiphile, optionally a second organic compound miscible with both aqueous and organic phases, and water. The amphiphile is present in an amount that completely solubilizes the water-insoluble organic compound, thereby resulting in a clear, stable microemulsion.

VEHICLE

Microemulsions are defined as thermodynamically stable isotropic "solutions" of water, oil, and amphiphile and are used to solubilize water-insoluble compounds. In the practice of the invention, the microemulsion comprises water, at least one water-insoluble organic compound, at least one amphiphile, optionally a second organic compound miscible with both aqueous and organic phases, and water. The second organic solvent is miscible with both the discontinuous and the continuous phase of the vehicle. Within the microemulsion composition, the function of the amphiphile is to lower the interfacial tension between water and the water-insoluble organic compound, thereby forming a stable system. The amphiphile is present in an amount that completely solubilizes the water-insoluble organic compound, thereby resulting in a clear, stable microemulsion.

WATER-INSOLUBLE ORGANIC COMPOUND

Examples of water-insoluble organic compounds that may be suitably employed in the practice of the invention include, but are not limited to, water-insoluble ethyleneoxy- and propyleneoxy-oils, water-insoluble mono- or polyglycol ethers; water-insoluble mono- or polyglycol phenyl ethers; water-insoluble alcohols; water-insoluble polyols, water-insoluble mono-or polyglycol esters; water-insoluble terpenes; water-insoluble phenols; water-insoluble aldehydes and ketones; water-insoluble hydrocarbons, and water-insoluble polyether modified polysiloxanes. In general, any water-insoluble organic compound, or combination thereof, may be employed in the practice of the invention so long as it may be solubilized by an amphiphile and so long as it is compatible with the other components in the ink-jet ink composition. Specific examples of water-insoluble organic compounds that are preferably employed in the practice of the invention include, but are not limited to: (1) ethylene, propylene, polyethylene, and polypropylene glycol phenyl ethers; (2) ehtylene, propylene, polyethylene, and polypropylene glycol esters such as acrylates; and (3) benzyl alcohol. Additionally, specific examples of preferably employed hydrocarbons include toluene, xylenes, naphthalene, and phenanthrene. Further examples of the water-insoluble organic compounds include alpha-terpineol, citronella, hydroxy citronella, cyclohexyl methanol, cyclohexanone and its alkyl ($C_1$ to $C_8$) derivatives, cyclohexanol and its alkyl ($C_1$ to $C_8$) derivatives, cyclopentanone and its alkyl ($C_1$ to $C_8$) derivatives, cyclopentanol and its alkyl ($C_1$ to $C_8$) derivatives, eugenol, 1-heptanool, n-hexanol, 2-hexanol, n-pentanol, cinnamyl alcohol, 2-ethyl-1,3-hexanediol, 7-octene-1,2-diol, 2,2-diethyl-1,3-propanediol, 1-benzyl-2-pyrrolidinone, polycaprolactone triol, cinnamaldehyde, m-cresol, 3-phenyl-1-propanol, salicylaldehyde and water-insoluble polyether modified polysiloxanes such as GP-226 available from Genesee Polymers (Flint, Mich.) and Addid 210 available from Wacker (Adrian, Mich.). Mono- and diethylene glycol phenyl ether, mono- and dipropylene glycol phenyl ether, and benzyl alcohol are most preferably employed in the practice of the invention.

The water-insoluble organic component may range in concentration from about 1 to about 70 wt % of the ink-jet ink composition, and preferably, from about 1 to about 30 wt %.

In addition to providing the microemulsion with an oil component, the water-insoluble organic component serves as a co-solvent in the present ink-jet ink compositions such as commonly employed in ink-jet printing. More particularly, when the pen of the ink-jet printer idles and is exposed to the atmosphere, the water in the ink vehicle evaporates. The presence of this co-solvent in the ink vehicle prevents crust formation and nozzle clogging. Hence, the vapor pressure of the organic compound should be sufficiently low in comparison to that of water that it does not evaporate during the normal operation of ink-jet printing. It is noted that n advantage to increasing the concentration of the water-insoluble organic component in the present ink-jet ink compositions is a reduction in paper cockle, which derives from the attendant decrease in the water content of the ink.

MISCIBLE ORGANIC SOLVENT

The optional second organic solvent is miscible with both the discontinuous and the continuous phase. This added solvent, which also functions as a co-solvent, reduces the formation of crusts or beards and enhances the pen reliability. Organic solvents suitably employed in the present invention include, but are not limited to, alkanolamines; lactams such as 2-pyrrolidone; glycols; diols such as 1,2- or 1,5- pentanediol; triols; glycol esters; mono- and di- glycol ethers, including ethylene glycol mono butyl ether, diethylene glycol ethers, diethylene glycol mono ethyl, butyl, hexyl ethers, propylene glycol ether, dipropylene glycol ether, and triethylene glycol ether; mid chain alcohols such as 2-pentyl alcohol; oxyalkylated alcohols such as Alfonic 610-3.5 or 810-2 available from Vista Chemical Co. (Houston, Tex.); acetylenic polyethylene oxides, and polyethylene and polypropylene oxides. The second solvent may represent from about 0 to about 20% of the ink composition. Preferably it may represent from about 0.1% to about 15%, and most preferably from about 0.1% to about 10% of the ink composition. Preferably, triethanolamine (TEA), pentanediol (PDIOL), 2-pyurrolidone (2P), or a mixture thereof, is used

AMPHIPHILE

The amphiphile employed in the practice of the invention may be any amphiphile that yields a microemulsion with the water-insoluble organic compound and water, preferably a hydrotropic amphiphile is used. Suitable hydrotropic amphiphiles, like other surfactants in general, solubilize the water-insoluble organic compound in water by breaking the compound into very small droplets and maintaining these droplets in a microemulsion. However, unlike other classes of surfactants, hydrotropic amphiphiles yield relatively large microemulsion regions in the phase diagram, thus making them more suitable for ink-jet applications—large microemulsion region in the phase diagram translates to wider range of vehicle compositions to choose from for formulating the ink. A large microemulsion region in the phase diagram also provides for more robust ink compositions such that changes in the composition (e.g., due to evaporation) during pen idle do not adversely affect the pen performance. Furthermore, hydrotropic amphiphiles do not result in the precipitous drop in surface tension associated with the use of other surfactants, such that the reduction in surface tension for inks employing hydrotropic amphiphiles in the practice of the invention is curbed in comparison. In contrast, the steep drop in surface tension caused by the incorporation of other surfactants into ink-jet inks is known to cause puddles on the nozzle plates of the printhead, thereby negatively affecting drop ejection characteristics. Moreover, these other surfactants increase the penetration rate of the ink into the paper to such a degree that edge acuity may be affected. Thus, hydrotropic amphiphiles serve to solubilize the water-insoluble organic compound without risking (1) pen reliability; (2) puddling on the nozzle plate; or (3) loss of edge acuity.

Examples of common non-hydrotropic amphiphiles (surfactants) include alkyl sulfonates, alkyl substituted benzene sulfonates, naphthalene sulfonates, alkylamine oxides, subsituted ammonium salts, and the non-ionics.

The hydrotropic amphiphile may be anionic, cationic, or non-ionic in nature. Examples of anionic hydrotropic amphiphiles suitably employed in the practice of the invention include, but are not limited to, salts of benzoic acid, salicylic acid, benzene acid, benzene disulfonic acid, toluene sulfonic acid, xylene sulfonic acid, cymene sulfonic acid, cymene-sulfonic acid, cinnamic acid, octane sulfonic acid, hexane sulfonic acid, butane sulfonic acid, and decane sulfonic acid. The cation associated with these salts may be $Na^+$, $K^+$, $Li^+$, or $NH_4^+$.

Examples of cationic hydrotropic amphiphiles suitable employed in the practice of the invention include, but are not limited to, p-amino benzoic acid hydrochloride, procaine hydrochloride, caffeine; and salts of alkylpyridium, alkyltrimethyl ammonium, benzyltrialkyl (C1 to C4) ammonium, and phenyltrimethyl ammonium cations. The anion associated with these salts may be any of the halides, particularly Cl.

Examples of non-ionic hydrotropic amphiphiles suitably employed in the practice of the invention include, but are not limited to, resorcinol and pyrogallol.

The proper amount of amphiphile in the microemulsion is that amount that solubilizes the water-insoluble organic compound. It is noted that a mixture of amphiphiles may be employed in the practice of the invention. The determination of the amount of a given amphiphile and its concentration is considered not be constitute undue experimentation in view of the teachings of this invention.

The amount of amphiphile appropriately employed in a particular microemulsion may be determined in at least two ways, namely by an abbreviated method of a more systematic method. In the abbreviated method, one must first combine the water-insoluble organic compound(s), the optional second organic compound(s), and water in a ratio that reflects the desired final composition of the microemulsion for the ink-jet ink composition. The resulting two-phase liquid is thereafter titrated with the selected amphiphile(s) until a clear solution is obtained, representing the solubilization of the organic compound such that a single-phase solution is achieved. About 1% excess amphiphile may optionally be added to ensure a stable solution. Thus, the appropriate relational concentration is of the water-insoluble organic compound(s), the second organic compound(s), water, and amphiphile(s) are determined through the above-described titration process.

In the event one chooses to determine the appropriate amount of amphiphile(s) in a more systematic approach, the first step involves the construction of a phase diagram to represent the combination of the water-insoluble organic compound, the optional second organic solvent, and water. More specifically, a phase diagram is constructed by combining water, the water-insoluble organic compound(s), and the optional second organic solvent(s) in various proportions, titrating each mixture against the amphiphile(s) until a clear, single-phase region is determined within the phase diagram (the first end-point). By further titrating beyond the first end-point, other regions of multi-phase or semi-solid compositions can be determined (the second end-point). These results, when plotted on a conventional triangular plot, represent a partial ternary phase diagram.

Consistent with the requirements for this invention, various types of additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (RT Vanderbilt Co.), and PROXEL (ICI America). Additionally, sequestering agents such as EDTA may be included to eliminate deleterious effects of heavy metal impurities but as described above, sequestering agents should be used judiciously with minimum levels. Buffer solutions may also be used to control the pH of the ink. Other known additives such as viscosity modifiers and other acrylic or non-acrylic polymers may be added to improve various properties of the ink compositions as desired.

PREPARATION OF DYES

The method of synthesis for these dyes are well known are disclosed, for example, in U.S. Pat. Nos. 4,207,104 and 4,273,706, both assigned to Eastman Kodak Company, and both incorporated herein by reference. For example U.S. Pat. No. 4,273,706 describes the preparation of 4-hydroxy-3-(2'-pyridylazo)-1-naphthalenesulfonic acid; and the blocking of the naphthol group of 4-hydroxy-3-(2'-pyridylazo)-1-naphthalenesulfonic acid with a benzoyl moiety and the conversion of the sulfonic acid to a sulfonyl chloride.

The conversion of the sulfonyl chloride to a sulfonamide is performed via standard reaction of the acid chloride with the appropriate amine. The benzoyl blocking group on the naphthol can be removed with mild hydrolysis if it has not already been displaced during formation and work up of the amide.

The metal complexes can be prepared by standard procedures. A stoichiometric quantity of a metal (Ni(II), Cu(II), Co(II), etc.) salt (acetate preferred for alcohol, chloride for water, etc.) which rapidly exchanges water maybe added in a titrimetric fashion to solutions of ligand with the complexes forming upon mixing. More slowly exchanging metals such as Cr(III) will require heat.

EXAMPLES

Example 1

Inks were prepared, comprising the following composition in wt %:

| | |
|---|---|
| EHPD | 7.5% |
| 2-Pyrrolidone | 7.5% |
| 1,5-PentaneDiol | 8% |
| Tergitol 15S7 | 2% |
| Proxel GXL | 0.2% |
| Colorant | concentration adjusted to yield a visible optical absorbance (1 cm) of about 0.7 at lambda$_{max}$ca 530 nm for a 1:1000 ink dilution |
| water | balance |

The dyes used to formulate the inks include:

Dye 1—Nickel II ($Ni^{+2}$) complex of dye ligand (4-Hydroxy-3-(2'-pyridylazo)-1-naphthalenesulfonic acid), wherein $R_2$ is $SO_3H$ (FORMULA III);

Dye 2—Nickel II ($Ni^{+2}$) complex of dye ligand (N,N-bis(carboxymethyl)-4-hydroxy-3-(2'-pyridylazo)-1-naphthalenesulfonamide), wherein $R_4$ and $R_5$ are —$CH_2COOH$ (FORMULA IV)

Acid Red 52 (AR52); and

Reactive Red (RR180).

FORMULA III

FORMULA IV

Lightfade was measured for the formulated inks on the following media, and the data is reported in Table 1: Premium Ink Jet Glossy Paper, part number HP C3836A, available from Hewlett-Packard Company, Palo Alto, Calif.; Epson Stylus Color Ink Jet Printer High Quality Glossy Paper, part umber S041033, available from Seiko Epson Corp., Nagano, Japan; Ink Jet Paper 26 lb, part number HP51634Y, available from Hewlett-Packard Company; and Champion Data Copy plain paper 20 lb, part number DC11, available from Champion International Inc., Stamford, Conn. The effect of the formulated inks on lightfade was measured by printing step tablet images on selected representative media, each image comprising color palette squares of varying density approximately 1 cm$^2$, for each ink, using a Hewlett-Packard DeskJet 1600C printer and Hewlett-Packard 51640X series print cartridge (ink-jet pen, both commercially available from Hewlett-Packard Company). The color palettes were generated using Dot on Dot print mode to generate palettes with "Status A" reflection optical densities bracketing 0.3, 0.6, and 1.0 densities.

The print samples (step tablet images) were first quantified for Status A "initial" (before exposure) optical densities, OD's, and then exposed to the equivalent of five years of indoor lightfade (12 hrs/day for 365 days/yr×5 yrs at 450 lux of Cool White Fluorescent illuminant) using an accelerated exposure with an Atlas HPUV fade chamber (available from Atlas Electric Devices Co., Chicago Ill.). Following light exposure, the samples were again quantified as to OD's at the same locations on each step to yield "after" exposure densities. The Status A optical densities, OD's, of the images were measured using an X-Rite Model 938 Densitometer, available from X-Rite Inc., Grandville, Mich. The lightfade for each sample step density was calculated as a percent density loss (Equation 1) by using the average of three separate measurements. The % density loss at 0.3, 0.6, and 1.0 densities were calculated by linear interpolation of the results for the bracketing steps.

EQUATION 1

((OD before fade−OD after fade)/(OD before fade))*100%

TABLE 1

| | | DYE USED IN THE INKS | | | |
|---|---|---|---|---|---|
| | | DYE 1 | DYE 2 | AR52 | RR180 |
| PAPER | initial OD | % OD Loss | % OD Loss | % OD Loss | % OD Loss |
| HP Glossy | 0.3 | 18.4 | 28.6 | ICF[1] | ICF |
| | 0.6 | 16.6 | 26.9 | ICF | ICF |
| | 1.0 | 15.8 | 26.4 | ICF | ICF |
| Epson HQ Glossy | 0.3 | 29.4 | 50.2 | 99.2 | 85.2 |
| | 0.6 | 23.4 | 43.3 | 99.0 | 73.7 |
| | 1.0 | 20.5 | 37.7 | No Data | 63.6 |
| HP Ink Jet Paper | 0.3 | 55.2 | 62.0 | ICF | 91.4 |
| | 0.6 | 48.2 | 54.4 | ICF | 89.0 |
| | 1.0 | 41.8 | 51.9 | ICF | 87.1 |
| Champion Data Copy | 0.3 | 14.5 | 33.3 | ICF | 71.9 |
| | 0.6 | 9.9 | 23.0 | ICF | 56.9 |
| | 1.0 | 0.5 | 12.6 | ICF | 37.0 |

[1]image completely faded (ca. 100%).

Example 2

Figure 1:
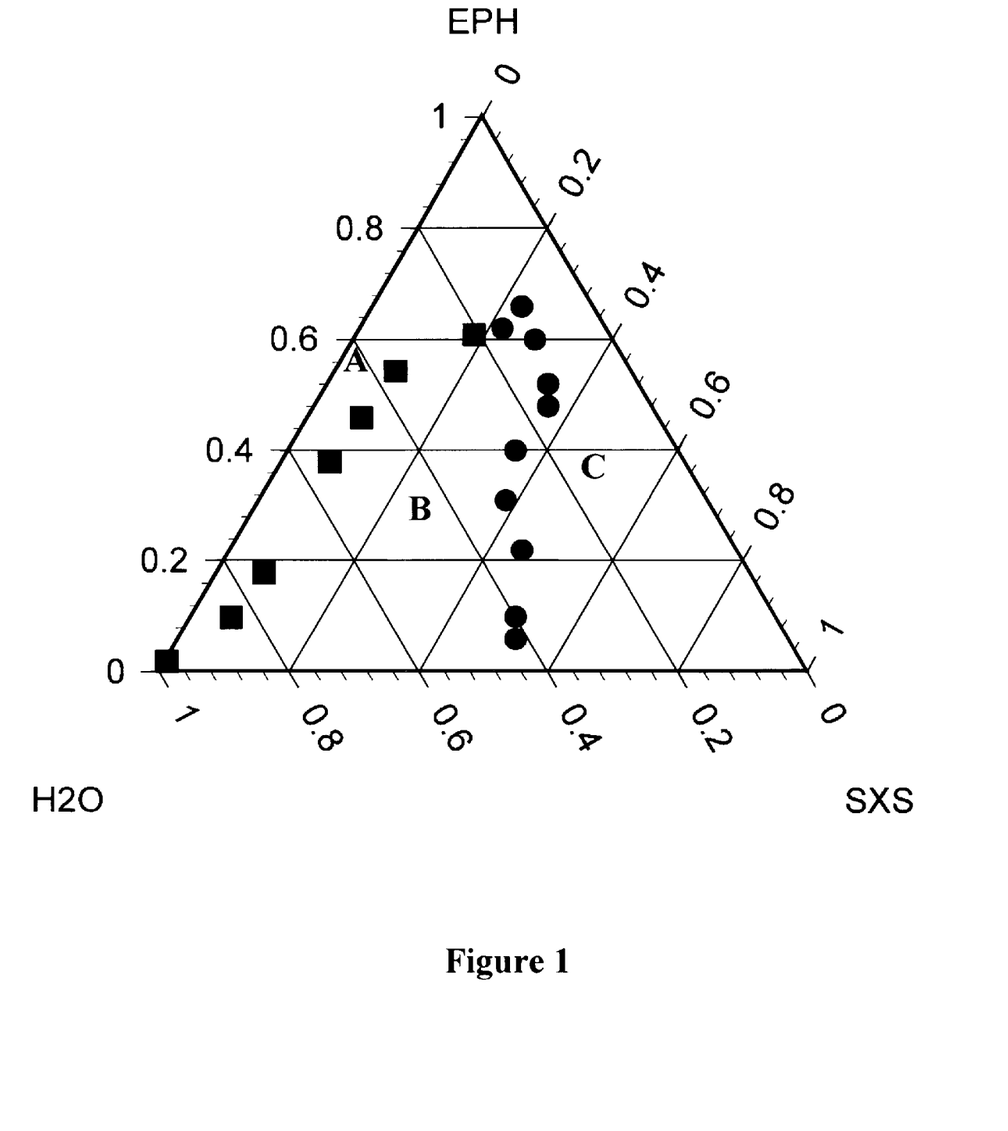
FIG. 1 is a ternary phase diagram showing the composition regions of the microemulsion-based vehicle component of ink-jet compositions, the microemulsion component having a particular combination of at least one water-insoluble organic compound, at lease one amphiphile, and water.

An ink-jet composition was prepared comprising 3 wt.% [N,N-bis(n-hexyl)-4-hydroxy-3-(2'-pyridylazo)-1-naphthalenesulfonamide]$_2$Ni dye complex, 30 wt. % ethylene glycol phenyl ether (EPh), 9 wt. % sodium xylene sulfonate (SXS) and the balance water, with the concentrations of the vehicle components being determined by the phase diagram depicted in FIG. 1. More specifically, the phase diagram depicted in FIG. 1 was constructed by combining the organic solvent (EPh), and water in various proportions and then titrating each mixture against SXS until a clear single phase region was determined. Thus, Area A of FIG. 1 represents the various combinations of the organic solvent, SXS and water that yielded a two phase region as evidenced by a milky appearance. Area B of FIG. 1 represents the various combinations of the organic solvent, SXS and water that yielded a clear single phase region (microemulsion region). Area C of FIG. 1 was defined by further titrating the organic solvent mixture, SXS and water beyond the clear point until a semi-solid or multi-phase region was observed (second end-point). The single phase isotropic region Area B of FIG. 1 represents compositions of EPh, SXS and water that may be suitably employed in the practice of the invention.

The inks were filled into ink-jet pens and print samples were generated, and evaluated for lightfade as described above. The papers used included Champion Data Copy, and Gilbert Bond available from Mead Company.

The inks comprising oil-soluble dyes made according to the present invention demonstrated excellent lightfade. Similar results were observed using benzyl chloride as the organic solvent.

It is desirable that the lightfade value be minimized. As evidenced by the values in Table 1, each of the inks formulated in accordance with the present invention had significantly lower lightfade values. It should be noted that the inks of the present invention demonstrated improved lightfastness (lower lightfade) across the media set.

Thus, it has been demonstrated that inks formulated according to the present invention to include metal complex colorants containing dye ligands of 4-hydroxy-3-(2'-pyridylazo)-1-(sulfo substituted) naphthalene type, and more preferably, sulfonamide substituted ligands of the types: 4-hydroxy-3-(2'-pyridylazo)-1-naphthalenesulfonamide; N-substituted-4-hydroxy-3-(2'-pyridylazo)-1-naphthalenesulfonamide; N,N-bis (substituted)-4-hydroxy-3-(2'-pyridylazo)-1-naphthalenesulfonamide); and a polyvalent metal ion, preferably, selected from the group (Ni(II), Cu(II), Co(II), Zn(II), and Cr(III); provide ink-jet prints having excellent lightfade.

What is claimed is:

1. An aqueous ink for ink-jet printing, comprising:
    a 4-hydroxy-3-(2'-pyridylazo)-1-(sulfo substituted) naphthalene magenta dye ligand, said dye ligand coordinating a polyvalent metal ion thus forming a metal complex; and
    aqueous ink vehicle.

2. The ink of claim 1 wherein
    the magenta dye-ligand is selected from the group consisting of 4-hydroxy-3-(2'-pyridylazo)-1-naphthalenesulfonic acid; 4-hydroxy-3-(2'-pyridylazo)-1-naphthalenesulfonamide; N-substituted-4-hydroxy-3-(2'-pyridylazo)-1-naphthalenesulfonamide; N,N-bis(substituted)-4- hydroxy-3-(2'-pyridylazo)-1-naphthalenesulfonamide; and mixtures thereof.

3. The ink of claim 2 wherein the dye ligand has the formula wherein
- $R_1$ is independently selected from the group consisting of $R_2$, and $R_3$;
- $R_2$ is $SO_3M$, wherein M is a positively charged moiety;
- $R_3$ is $SO_2NR_4R_5$; and
- $R_4$ and $R_5$ are independently selected from the group consisting of hydrogen and hydrophobic oil-solubilizing moieties, or $R_4$ is selected from the group consisting of hydrogen and hydrophilic water-solubilizing moieties and $R_5$ is selected from the group consisting of hydrophilic water solubilizing moieties.

4. The ink of claim 3 wherein the metal complex comprising the dye ligand comprises:

wherein
- $R_1$, $R_2$, $R_3$, $R_4$, and $R_5$ are as defined above;
- Me is a polyvalent metal;
- Z is either another dye ligand or a colorless ligand to complete the coordination sphere, said colorless ligand selected to provide the appropriate solubility.

5. The ink of claim 4 wherein

M is selected from the group consisting of $H^+$, $Li^+$, $Na^+$, $K^+$, $Cs^+$, protonated amines, and quaternary ammoniums.

6. The ink of claim 3 wherein $R_4$ is selected from the group consisting of hydrogen and hydrophilic water-solubilizing moieties and $R_5$ is selected from the group consisting of hydrophilic water-solubilizing moieties.

7. The ink of claim 6 wherein the water solubilizing moiety is selected from the group consisting of anionic groups$^-$, cationic groups$^+$, and neutral groups.

8. The ink of claim 7 wherein the anionic water solubilizing moiety is an anionic derivative selected from conjugate bases of the group consisting of alkyl or aryl sulfonic acids, alkyl or aryl carboxylic acids, alkyl or aryl phosphate, alkyl or aryl phosphonic acids, and oxy anions.

9. The ink of claim 7 wherein the cationic water solubilizing moiety is selected from the group consisting of alkyl or aryl protonated amines, alkyl or aryl quaternary ammoniums, and quaternary pyridiniums.

10. The ink of claim 7 wherein the neutral water solubilizing moiety contains large fractions of either or both nitrogen and oxygen atoms.

11. The ink of claim 7 wherein the neutral water solubilizing moiety is a polar moiety selected from the group consisting of alkyl or aryl amines, alkyl or aryl amides, alkyl or aryl alcohols, alkyl or aryl ketones, and heterocyclics.

12. The ink of claim 3 wherein $R_4$ and $R_5$ are independently selected from the group consisting of hydrogen and hydrophobic oil solubilizing moieties.

13. The ink of claim 12 wherein the hydrophobic moiety is selected from the group consisting of aliphatic, aromatic, and aliphatic-aromatic functionalities, provided that the hydrophobic moiety comprises at least four carbon atoms.

14. The ink of claim 12 wherein

The hydrophobic moiety is selected from the group consisting of n-hexyl, benzyl, and t-butyl.

15. The ink of claim 4 wherein the polyvalent metal is selected from the group consisting of Nickel II($Ni^{+2}$), Cobalt II ($Co^{+2}$), Copper II ($Cu^{+2}$), Zinc II ($Zn^{+2}$), and Chromium III ($Cr^{+3}$).

16. The ink of claim 15 wherein the polyvalent metal is Nickel II ($Ni^{+2}$).

* * * * *

UNITED STATES PATENT AND TRADEMARK OFFICE
CERTIFICATE OF CORRECTION

PATENT NO. : 5,980,622

DATED : November 9, 1999

INVENTOR(S) : Gary W. Byers

It is certified that error appears in the above-identified patent and that said Letters Patent is hereby corrected as shown below:

In column 1, line 12          delete "have" and insert --has--.

In column 1 line 34           delete "differing" and insert --different--.

In column 1 line 50           delete "4-hydroxy 3-(2'-pyridylazo)-1-naphthalenesulfonic acid;"

In column 2 line 20           insert --ink-- after ink-jet.

In column 2 line 22           delete "lease" and insert --least--.

In column 2 line 34           delete "of" and insert --on--.

In column 3 line 29           delete "hydrophbilic" and insert --hydrophilic--.

UNITED STATES PATENT AND TRADEMARK OFFICE
CERTIFICATE OF CORRECTION

PATENT NO. : 5,980,622

DATED : November 9, 1999

INVENTOR(S) : Gary W. Byers

It is certified that error appears in the above-identified patent and that said Letters Patent is hereby corrected as shown below:

| | |
|---|---|
| In column 4 line 10 | delete "more" and insert --most--. |
| In column 4 line 31 | delete "on" and insert --of--. |
| In column 4 line 61 | delete "suitable" and insert --suitably--. |
| In column 4 line 63 | delete "ore" and insert --or--. |
| In column 5 line 26 | delete "ore" and insert --or--. |
| In column 5 line 50 | delete "suitable" and insert --suitably--. |
| In column 6 line 27 | delete "DPTA" and insert --DTPA--. |

UNITED STATES PATENT AND TRADEMARK OFFICE
CERTIFICATE OF CORRECTION

PATENT NO. : 5,980,622

DATED : November 9, 1999

INVENTOR(S) : Gary W. Byers

It is certified that error appears in the above-identified patent and that said Letters Patent is hereby corrected as shown below:

| | |
|---|---|
| In column 7 line 1 | delete "08/892,767" and insert --08/892,769--. |
| In column 8 line 12 | delete "ehtylene" and insert --ethylene--. |
| In column 8 line 23 | delete "heptanool" and insert --heptanol--. |
| In column 8 line 53 | delete "n" and insert --an--. |
| In column 9 line 15 | delete "pyurrolidone" and insert --pyrrolidone--. |
| In column 9 line 58 | delete "subsituted" and insert --substituted--. |
| In column 10 line 3 | delete "suitable" and insert --suitably--. |
| In column 10 line 21 | delete "be" and insert --to--. |

UNITED STATES PATENT AND TRADEMARK OFFICE
CERTIFICATE OF CORRECTION

PATENT NO. : 5,980,622

DATED : November 9, 1999

INVENTOR(S) : Gary W. Byers

It is certified that error appears in the above-identified patent and that said Letters Patent is hereby corrected as shown below:

In column 10 line 26     delete "of" and insert --or--.

In column 10 line 38     delete "concentration is" and insert --concentrations of--.

In column 11 line 14     insert --and-- after well known.

In claim 5     delete "claim 4" and insert --claim 3--.

Signed and Sealed this

Twenty-fourth Day of October, 2000

Attest:

Q. TODD DICKINSON

*Attesting Officer*     *Director of Patents and Trademarks*